United States Patent
Fritsch et al.

(10) Patent No.: US 10,473,551 B2
(45) Date of Patent: Nov. 12, 2019

(54) TRACK LOADING TOOL

(71) Applicant: Actuant Corporation, Menomonee Falls, WI (US)

(72) Inventors: Matt Fritsch, Madison, WI (US); Jeremy Ogorzalek, Clarksville, MD (US); Tom Waterworth, Cottage Grove, WI (US); Kevin Rogers, Menomonee Falls, WI (US); Eric Schwert, Madison, WI (US); Arnold Decker, Aurora, IL (US); Tyler Jeffrey Johnson, Ripon, WI (US)

(73) Assignee: Actuant Corporation, Menomonee Falls, WI (US)

( * ) Notice: Subject to any disclaimer, the term of this patent is extended or adjusted under 35 U.S.C. 154(b) by 115 days.

(21) Appl. No.: 15/885,373

(22) Filed: Jan. 31, 2018

(65) Prior Publication Data
US 2019/0078967 A1 Mar. 14, 2019

Related U.S. Application Data

(60) Provisional application No. 62/558,828, filed on Sep. 14, 2017.

(51) Int. Cl.
*G01M 5/00* (2006.01)
*B66F 19/00* (2006.01)
(Continued)

(52) U.S. Cl.
CPC ........... *G01M 5/0058* (2013.01); *B66F 19/00* (2013.01); *E01B 33/00* (2013.01); *E01B 35/00* (2013.01)

(58) Field of Classification Search
CPC ........ F04B 51/00; F04B 49/065; F04B 49/06; F04B 17/03; F04B 2201/0802; F04B 49/10; F04B 13/00; F04B 19/22; F04B 2205/09; F04B 23/021; F04B 43/02; F04B 47/00; F04B 49/08; F04B 49/103; F04B 49/106; F04B 49/22; F04B 53/10; F04B 15/02; F04B 2201/0201; F04B 2201/0202; F04B 2201/0405; F04B 2201/0601; F04B 2201/1211; F04B 2203/0208; F04B 2203/0209; F04B 2205/04; F04B 2205/05; F04B 2205/13; F04B 2207/043; F04B 2207/701; F04B 2207/702; F04B 23/02; F04B 23/04; F04B 23/06; F04B 33/005; F04B 35/01; F04B 35/04; F04B 37/14;
(Continued)

(56) References Cited

U.S. PATENT DOCUMENTS 3,150,859 A * 9/1964 Payne .................... B62D 55/32
254/228
3,735,708 A * 5/1973 Plasser .................... B06B 1/183
104/12
(Continued)

*Primary Examiner* — Andre J Allen
(74) *Attorney, Agent, or Firm* — Michael Best & Friedrich LLP

(57) ABSTRACT

A track loading tool including a pump, a body including a main portion extending along a first axis, a first contact portion supported by the body and configured to engage a first rail, and a second contact portion supported by the body and configured to engage a second rail spaced apart from the first rail. The first contact portion and the second contact portion are positioned on a second axis offset from the first axis.

21 Claims, 7 Drawing Sheets

(51) Int. Cl.
 *E01B 33/00* (2006.01)
 *E01B 35/00* (2006.01)
(58) Field of Classification Search
 CPC ...... F04B 39/0292; F04B 39/08; F04B 39/10;
 F04B 39/1073; F04B 39/12; F04B
 39/121; F04B 43/0081; F04B 43/073;
 F04B 43/0736; F04B 47/026; F04B
 47/028; F04B 49/025; F04B 49/04; F04B
 49/225; F04B 53/1082; F04B 53/14;
 F04B 53/144; F04B 53/16; F04B 5/02;
 F04B 7/0076; F04B 7/02; F04D 15/0088;
 F04D 13/086; F04D 13/12; F04D
 15/0005; F04D 15/0227; F04D 27/001;
 F04D 13/068; F04D 13/14; F04D
 15/0272; F04D 19/04; F04D 19/042;
 F04D 1/06; F04D 27/009; F04D 27/02;
 F04D 29/668; F04D 29/669; F04D 5/002
 USPC .......................................................... 73/168
 See application file for complete search history.

(56) References Cited

U.S. PATENT DOCUMENTS

| | | | | |
|---|---|---|---|---|
| 5,214,907 A | * | 6/1993 | Livesay | B21L 9/065 |
| | | | | 59/11 |
| 2015/0316458 A1 | * | 11/2015 | Logan | G01M 5/0058 |
| | | | | 73/846 |
| 2018/0094961 A1 | * | 4/2018 | Krueger | G01F 23/205 |

* cited by examiner

TRACK LOADING TOOL

CROSS-REFERENCE TO RELATED APPLICATION

This application claims the benefit of co-pending, prior-filed U.S. Provisional Patent Application No. 62/558,828, filed Sep. 14, 2017, the entire contents of which are hereby incorporated by reference.

BACKGROUND

The present disclosure relates to a portable hydraulic tool and, more specifically, to a portable hydraulic tool for measuring lateral stability of rails or tracks.

SUMMARY

In one independent aspect, a track loading tool including a pump, a body including a main portion extending along a first axis, a first contact portion supported by the body and configured to engage a first rail, and a second contact portion supported by the body and configured to engage a second rail spaced apart from the first rail. The first contact portion and the second contact portion are positioned on a second axis offset from the first axis.

In another independent aspect, a tool for applying a lateral force on a portion of a track includes a pump, a body, a first contact portion, and a second contact portion. The body includes a main portion and a pair of legs protruding from the main portion. The main portion is oriented along an axis, and each of the legs includes an end offset from the axis of the main portion. The first contact portion is supported adjacent an end of one of the legs and is configured to apply a force on a first rail of the track. The second contact portion is supported adjacent an end of the other of the legs and is configured to apply a force on a second rail of the track.

In yet another aspect, a method for applying a lateral loading on a portion of a track includes: positioning a first contact portion adjacent an inner side surface of a first rail; positioning a second contact portion adjacent an inner side surface of a second rail, a line of action extending between the first contact portion and the second contact portion, the first contact portion and the second contact portion being connected to one another by a body that is offset from the line of action; and actuating a ram to cause the first contact portion and the second contact portion to exert a force on the first rail and the second rail.

Other independent aspects will become apparent by consideration of the detailed description and accompanying drawings.

DETAILED DESCRIPTION

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a portable track loading tool for testing lateral stability of rails or tracks, including portions of the tracks having intermediate rails (e.g., near track switches). Among other things, the tool includes a bridge portion positioned offset from contact heads on either end of the tool. The bridge portion is therefore offset from any intermediate rails, while the contact heads remain in line with walls of the outer rails to apply a lateral load against the outer rails. The tool tests the lateral strength of the outer rails at locations such as frogs and switches that include intermediate rails or obstructions.

Figure 1:
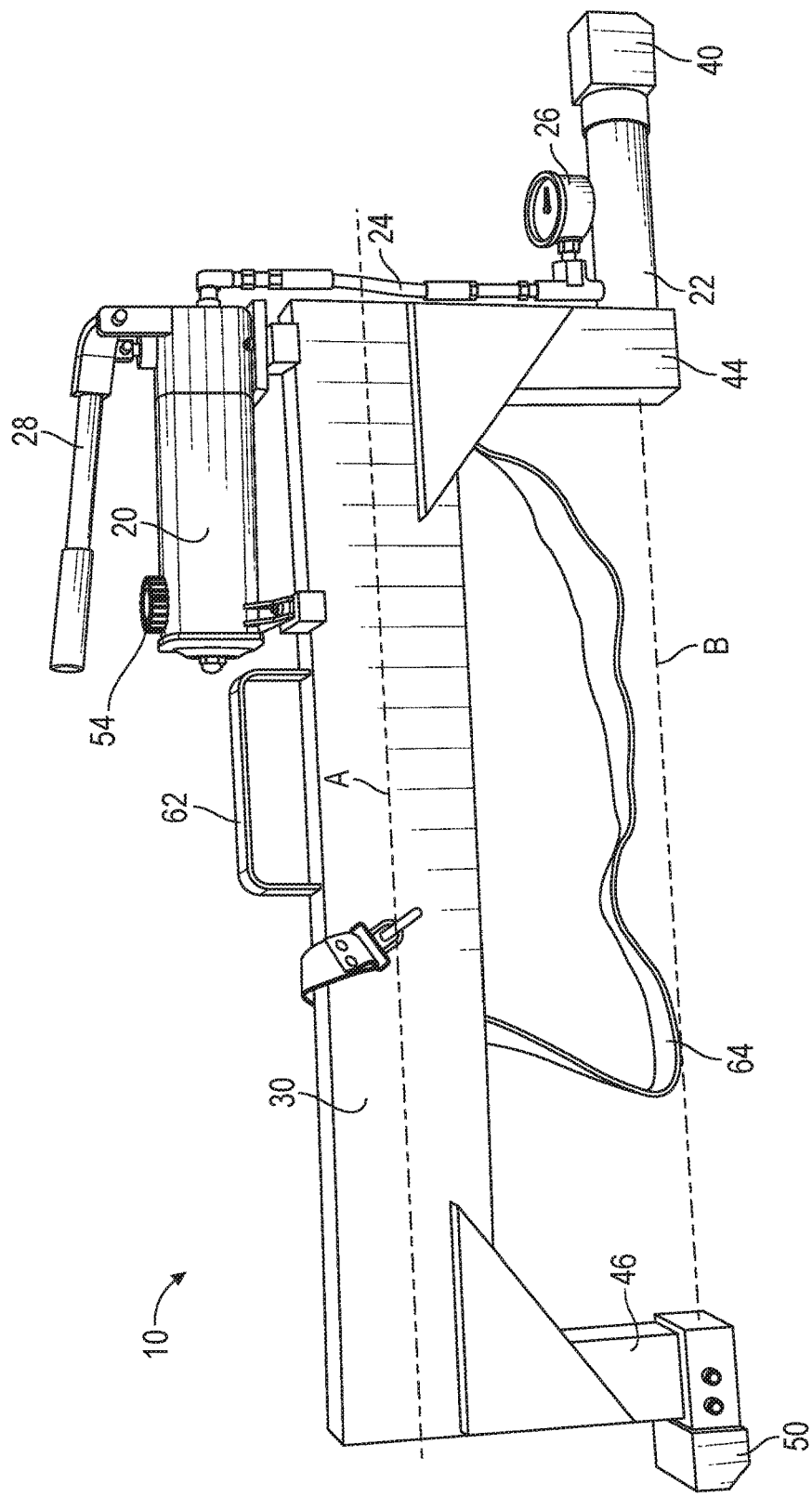
FIG. 1 is a side view of a track loading tool.
Figure 2:
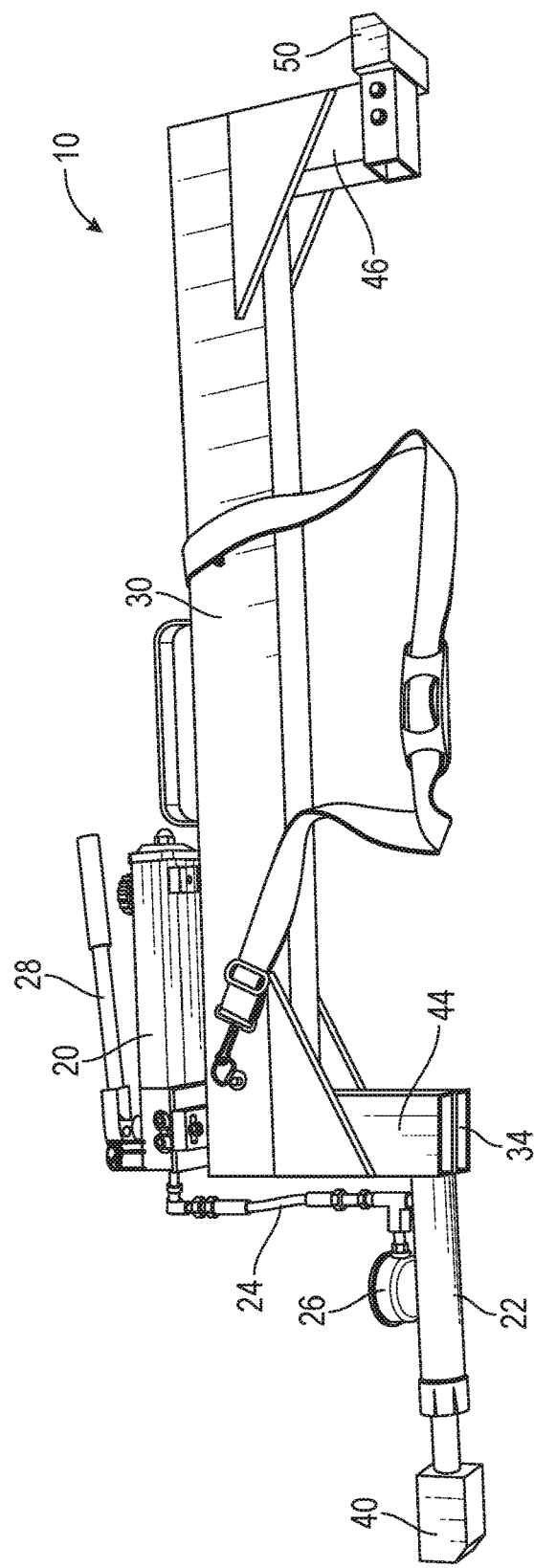
FIG. 2 is a perspective view of the track loading tool of FIG. 1.

FIGS. 1 and 2 illustrate a tool 10 including a pump or actuator 20, a body 30, a first contact head 40, and a second contact head 50. In some embodiments, the actuator 20 may be a fluid pump that is manually operable by moving a lever 28. As shown in FIG. 1, in the illustrated embodiment, the body 30 generally extends along a first axis A, and the first and second contact heads 40, 50 are generally positioned on a second axis B. In the illustrated embodiment, the second axis B is offset from and substantially parallel to the first axis A. In other embodiments, one or both of the axes A, B may be non-linear. Also, in the illustrated embodiment, the body 30 includes legs 44, 46, and each of the legs 44, 46 is positioned adjacent an end of the body 30 and oriented in a direction substantially normal to the first axis A of the body 30. In some embodiments, a carrying handle 62 and/or a flexible carrying strap 64 is secured to the body 30 to facilitate transporting the tool 10.

Figure 6:
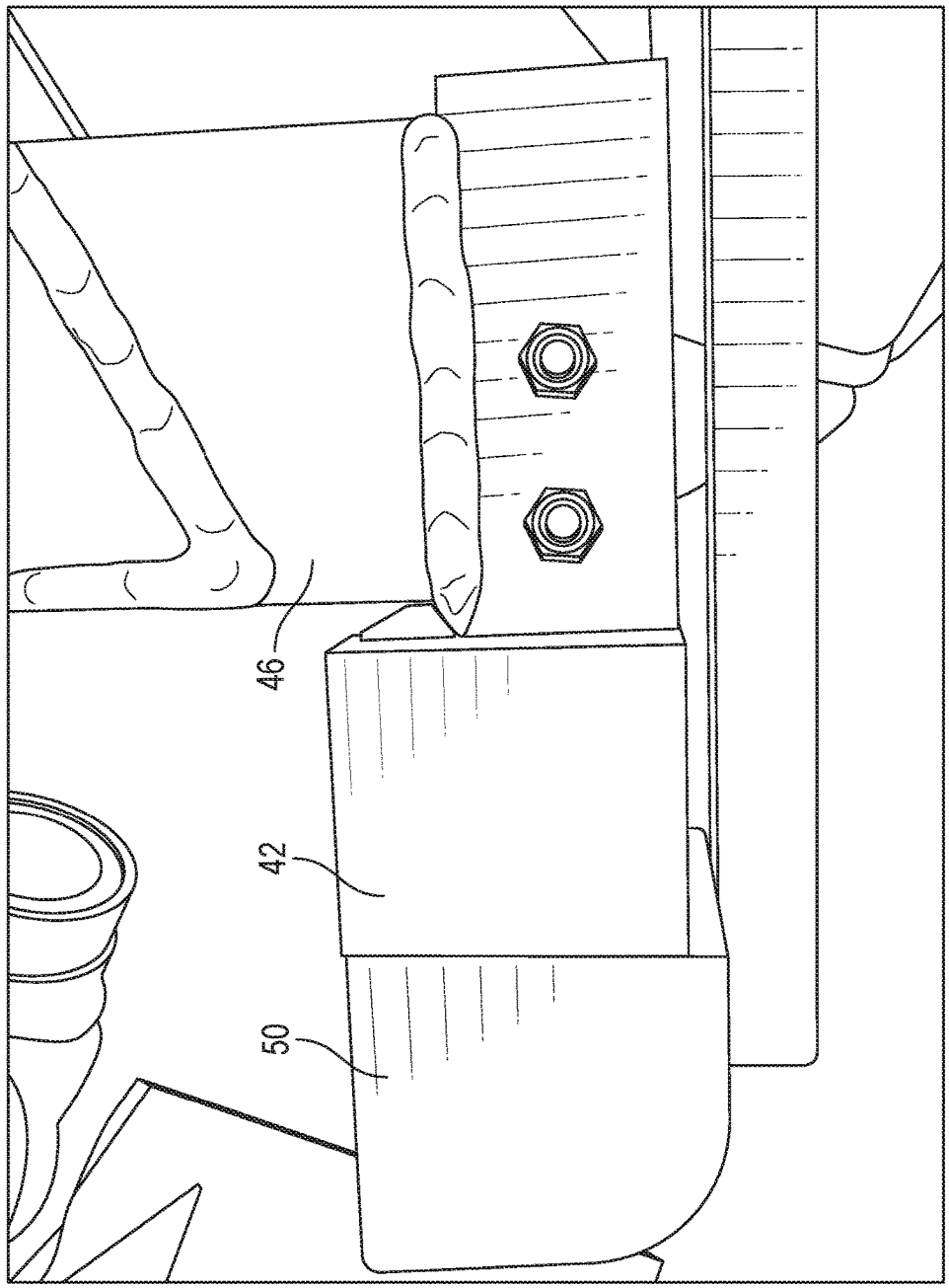
FIG. 6 is a side view of a contact head of the track loading tool of FIG. 2.

A ram 22 is positioned adjacent a distal end of a first leg 44, and the ram 22 is extendable in a direction parallel to the second axis B. The first contact head 40 is supported on the ram 22 such that the first contact head 40 can move in a direction parallel to the second axis B (or along the second axis B). The second contact head 50 is supported on an end of the second leg 46 and protrudes from the end of the second leg 46 in a direction parallel to the second axis B. The second contact head 50 may be directly supported on the second leg 46, or may supported by an intermediate member 42, as shown in FIG. 6.

Figure 3:
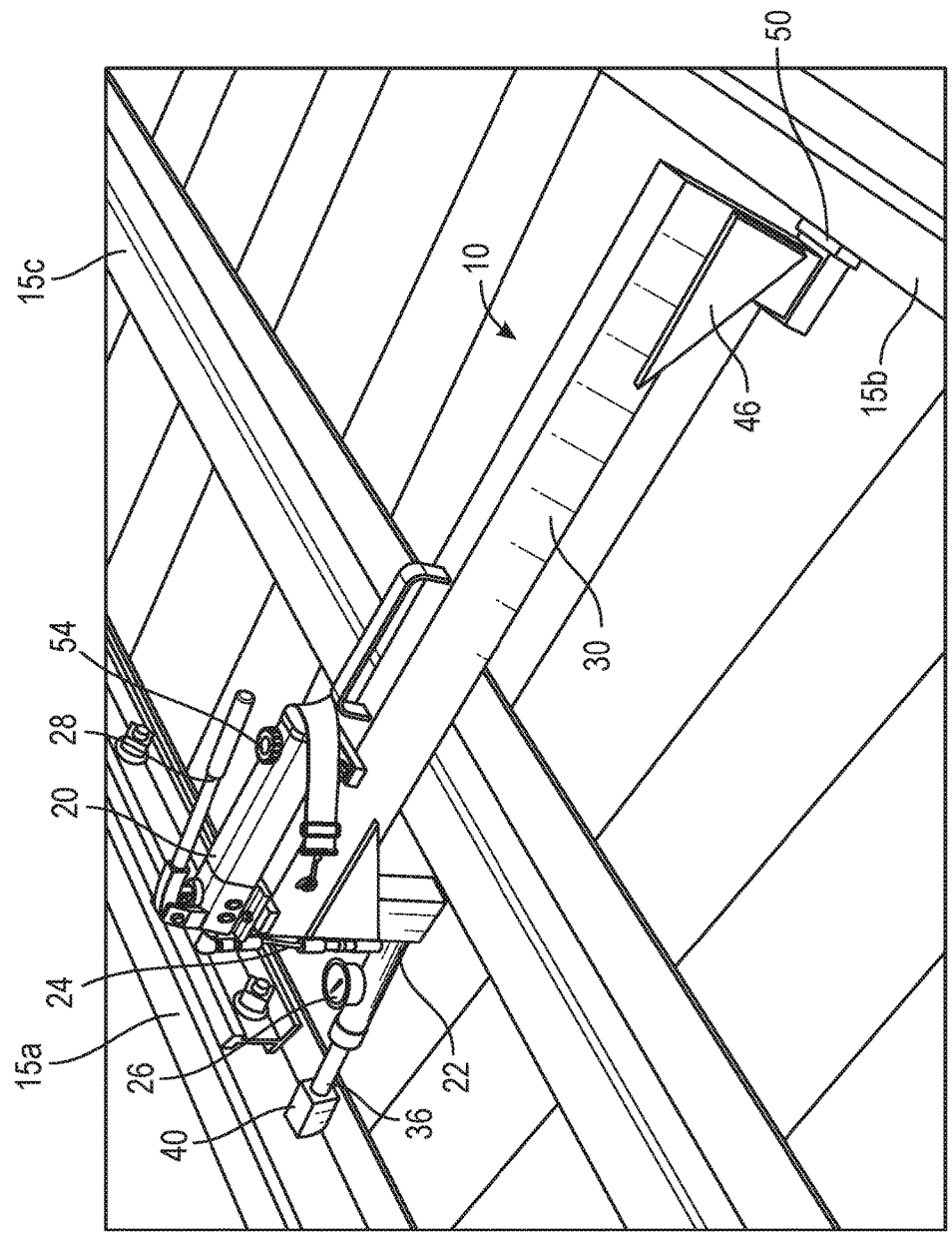
FIG. 3 is a perspective view of the track loading tool of FIG. 1 engaging a portion of a track.

As shown in FIGS. 2 and 3, a conduit (e.g., a hose 24) provides fluid communication between the actuator 20 and the ram 22. Operation of the lever 28 drives pressurized fluid (e.g., hydraulic fluid) from the actuator 20 to the hose 24, which is capable of delivering the pressurized fluid to an internal pressure chamber of the ram 22. The fluid may be prevented from passing back into the actuator 20 unless a relief valve 54 is opened. Also, a gauge or indicator 26 is in communication with the hose 24. During operation, the indicator 26 displays to a user a characteristic (e.g., pressure) indicative of the load being exerted by the tool 10 on the rails 15a, 15b.

As shown in FIG. 3, the tool 10 is positioned on a track or pair of rails 15a, 15b with the first contact head 40 and second contact head 50 each positioned adjacent the two rails upon which the load will be exerted. The contact heads 40, 50 are positioned between the rails 15a, 15b and oriented substantially normal to the rails 15a, 15b. The actuator 20 is operated to drive or pump fluid to the ram 22, thereby extending the ram 22 and causing the contact heads to engage the inner walls of the rails 15a, 15b. In the illustrated embodiment, the actuator 20 is a single-acting hydraulic actuator in which hydraulic fluid moves through the hose 24 and ram 22, moving a piston (not shown) and rod 36, thereby pushing the first contact head 40 in a first direction against one of the rails 15a. The load is also exerted on the rail 15b by the second contact head 50. In some embodiments, the tool 10 can apply approximately 4000 lb-f laterally between the rails 15a, 15b, and the user can monitor the lateral force by observing the indicator 26.

To uninstall the tool 10, the relief valve 54 can be operated to bleed or drain fluid from the ram 22 (e.g., back through the hose 24 to the actuator 20). The ram 22 can retract (e.g., by a spring return device—not shown) in a second direction opposite the first direction, removing the force from the rails 15a, 15b. When the first contact head 40 is retracted, the axial length between the contact heads 40, 50 is reduced and the tool 10 may be removed from the rails 15a, 15b. As shown in FIG. 3, the offset positioned of the contact heads 40, 50 and the body 30 permit the tool 10 to be used around intermediate rails 15c that are present at various locations along the track (e.g., near a switch). The contact heads 40, 50 may straddle the intermediate rail 15c while still applying a lateral load on the outer rails 15a, 15b.

Figure 4:
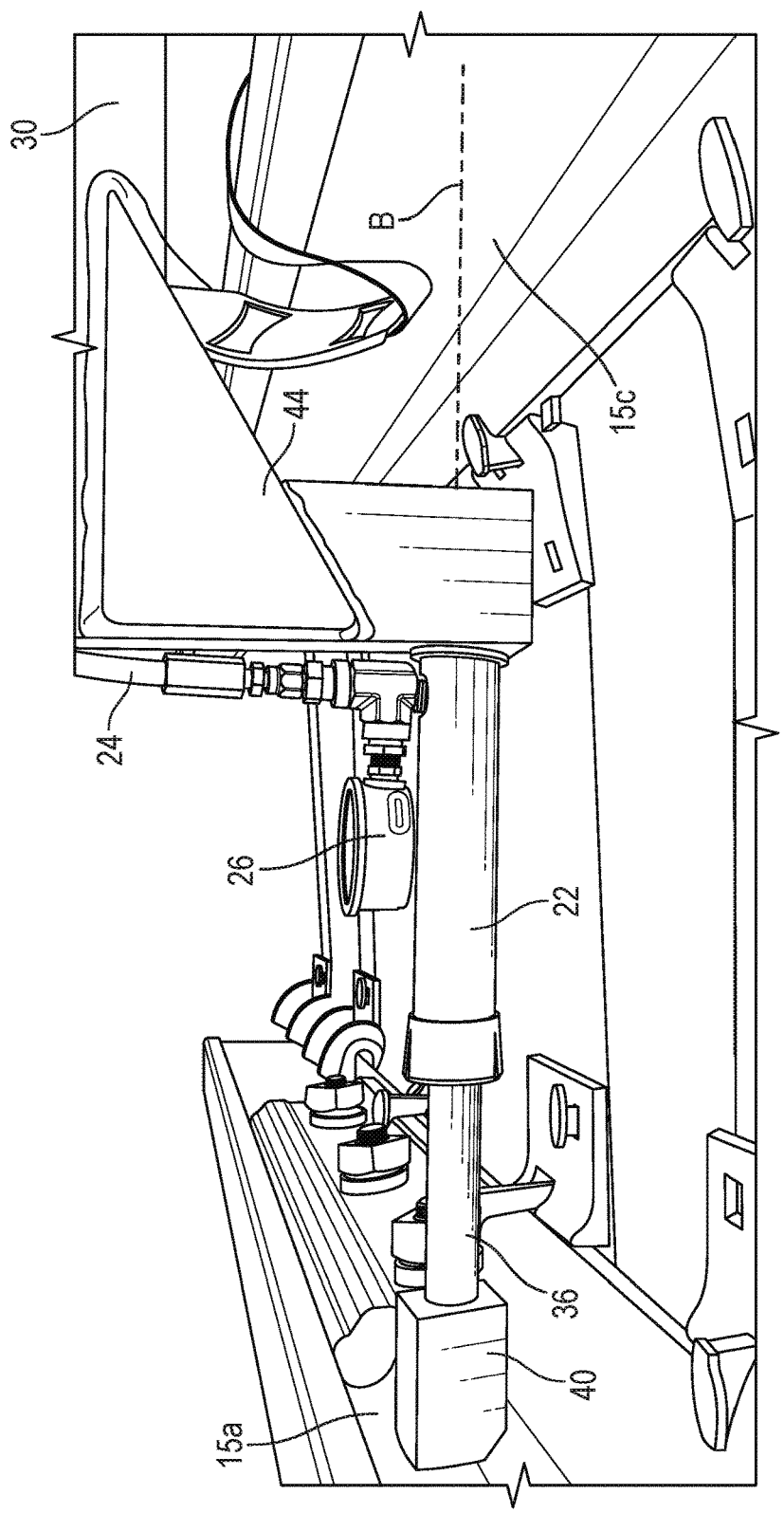
FIG. 4 is a side view of a portion of the track loading tool engaging a portion of the track of FIG. 3.
Figure 5:
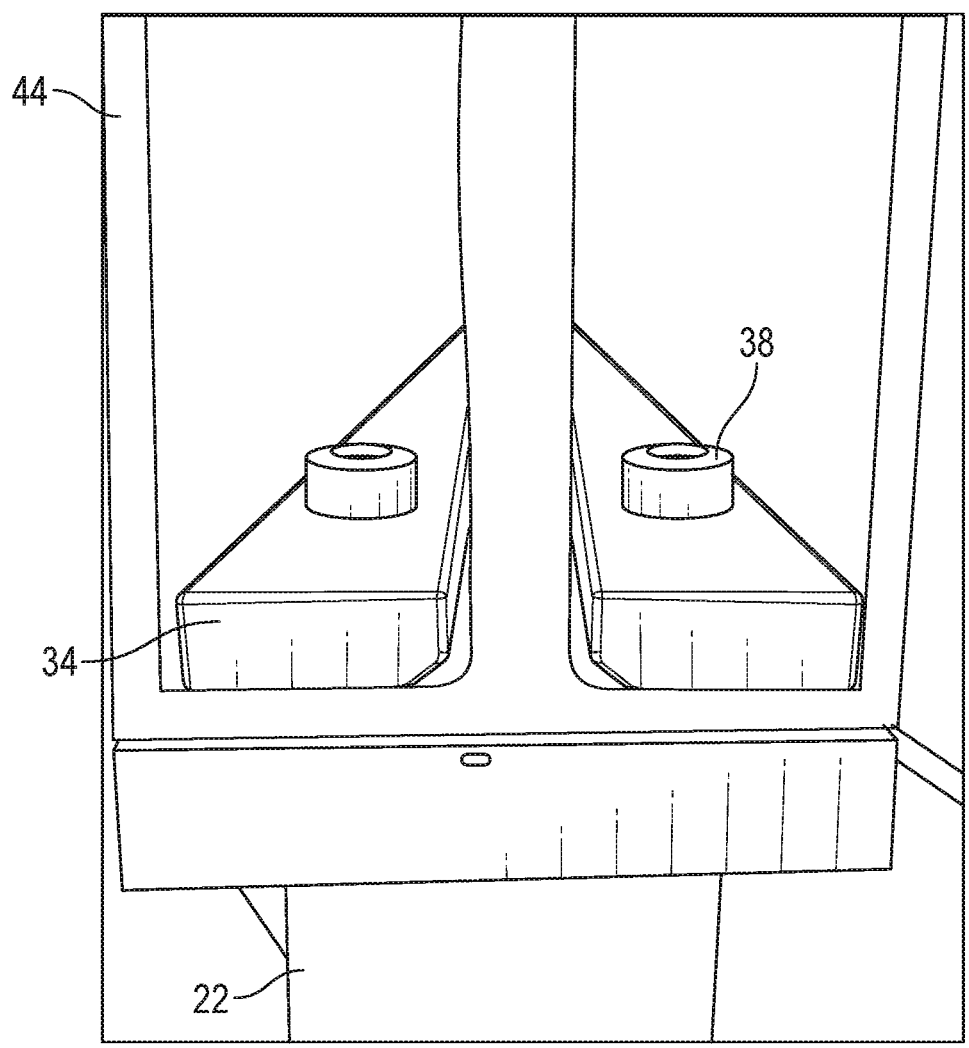
FIG. 5 is a lower plan view of an end of the track loading tool of FIG. 3.

FIG. 4 illustrates the engagement of the first contact head 40 and the rail 15a. The leg 44 offsets the body 30 from the second axis B. The body 30 is positioned above the intermediate rail 15c. Due to the offset between the body 30 and the contact heads 40, 50, stiffening elements or ribs 34 (FIG. 5) may be secured to one or more of the legs 44, 46 to increase rigidity, particularly while the lateral load is applied. In the embodiment shown in FIG. 5, the ribs 34 are coupled to the leg 44 and/or the ram 22 via a plurality of fasteners 38. Also, in the illustrated embodiment, the body 30 and legs 44, 46 are formed from aluminum; in other embodiments, another material may be used.

As shown in FIG. 6, the second contact head 50 connects to the associated leg 32 via the plate 42. In the illustrated embodiment, the second contact head 50 can be removed from the plate 42 and may be replaced with another contact head (not shown). For example, the second contact head 50 may be replaceable with another contact head due to wear, or may be replaceable with another contact head formed from a different material or having a different size to accommodate a particular use for the tool 10. In some embodiments, the first contact head 40 is similarly replaceable. The removal and replacement of contact heads allows for the contact heads to be replaced as needed due to wear and/or damage. The contact heads 40, 50 (or at least the portion of each contact head that is in direct contact with the rails 15a, 15b) may be made of electrically insulating materials, such as plastic, in order to prevent an electrical current from passing between the rails 15a, 15b.

Figure 7:
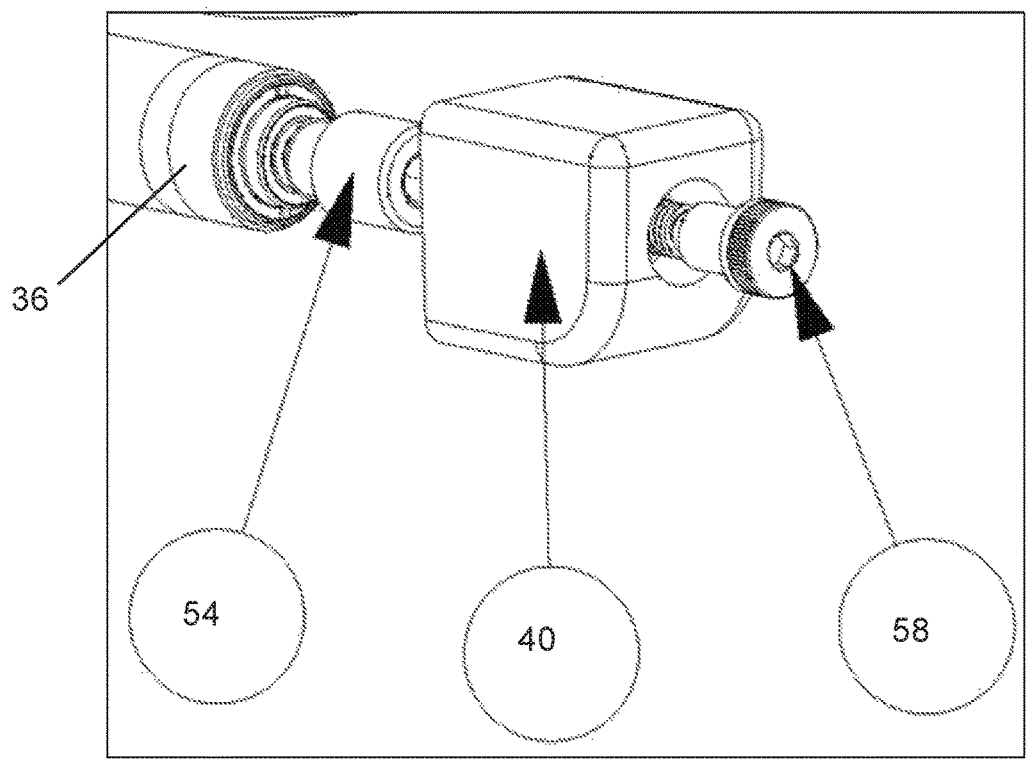
FIG. 7 is a perspective view of a contact head according to another embodiment.

As shown in FIG. 7, the contact heads 40, 50 may be rotatable in order to adjust the orientation of each contact head relative to the respective portion of the rail 15 and therefore improve the engagement between the contact head and the surface of the rail 15. In the illustrated embodiment, the first contact head 40 is rotatable relative to the rod 36. A post 54 extends from the rod 36 and the first contact head 40 is supported on the post 54. A fastener 58 (e.g., a screw) is inserted into an opposite side of the first contact head 40, extending through the first contact head 40 and into the post 54. In the illustrated embodiment, the head of the fastener 58 engages an end of the post 54 to capture the first contact head 40, and the first contact head 40 can be rotated without requiring the fastener 58 to be loosened. In other embodiments, the first contact head 40 may be coupled to the rod 36 in another manner. Although only the first contact head 40 is illustrated in FIG. 7, it is understood that the second contact head 50 can also be rotatable.

Although aspects have been described in detail with reference to certain preferred constructions, variations and modifications exist within the scope and spirit of one or more independent aspects as described. Various features and advantages are recited in the following claims.

What is claimed is:

1. A track loading tool comprising:
    a pump;
    a body including a main portion extending along a first axis;
    a first contact portion supported by the body and configured to engage a first rail; and
    a second contact portion supported by the body and configured to engage a second rail spaced apart from the first rail, the first contact portion and the second contact portion positioned on a second axis offset from the first axis.

2. The track loading tool of claim 1, wherein the first contact portion is supported on a ram that is extendable in a direction parallel to the second axis.

3. The track loading tool of claim 2, wherein the body includes a first leg and a second leg, each leg coupled to the main portion, wherein the ram is coupled to an end of the first leg and the second contact portion is supported on an end of the second leg.

4. The track loading tool of claim 2, further comprising a conduit providing fluid communication between the ram and the pump.

5. The track loading tool of claim 2, further comprising a valve operable to permit fluid flow from the ram back to the pump to de-pressurize the ram.

6. The track loading tool of claim 2, further comprising an indicator for displaying a fluid pressure in the ram.

7. The track loading tool of claim 1, wherein the first contact portion and the second contact portion are oriented to protrude in opposite directions along the second axis, the first contact portion and the second contact portion configured to positioned between the first rail and the second rail, the first contact portion and the second contact portion configured to exert a force in a direction transverse to the first rail and the second rail, respectively.

8. The track loading tool of claim 1, wherein at least one of the first contact portion and the second contact portion is removably coupled on the body to facilitate replacement of the at least one of the first contact portion and the second contact portion.

9. The track loading tool of claim 1, wherein the pump is a manually-operable fluid pump.

10. A tool for applying a lateral force on a portion of a track, the tool including:
   a pump;
   a body including a main portion and a pair of legs protruding from the main portion, the main portion oriented along an axis, each of the legs including an end offset from the axis of the main portion;
   a first contact portion supported adjacent an end of one of the legs and configured to apply a force on a first rail of the track; and
   a second contact portion supported adjacent an end of the other of the legs, the second contact portion configured to apply a force on a second rail of the track.

11. The tool of claim 10, wherein the axis of the main portion is a first axis, wherein the first contact portion and the second contact portion are positioned on a second axis offset from the first axis.

12. The tool of claim 10, wherein the first contact portion is supported on a ram that is offset from the main portion axis and is extendable in a direction parallel to the main portion axis.

13. The tool of claim 12, wherein the pump is in fluid communication with the ram and is manually operable to provide pressurized fluid to actuate the ram.

14. The tool of claim 12, further comprising a valve operable to permit fluid flow from the ram back to the pump to de-pressurize the ram.

15. The tool of claim 12, wherein at least one of the first contact portion and the second contact portion is removably coupled on the body to facilitate replacement of the at least one of the first contact portion and the second contact portion.

16. The tool of claim 12, wherein de-pressurizing the ram causes the ram to retract and withdraw the first contact portion away from the first rail.

17. The tool of claim 10, wherein at least one of the first contact portion and the second contact portion is movable relative to the body in a direction offset from and parallel to the main portion axis, the second contact portion and the first contact portion facing in opposite directions relative to each other.

18. The tool of claim 10, wherein at least one of the first contact portion and the second contact portion is pivotable relative to the associated leg of the body.

19. The tool of claim 10, further comprising a gauge for indicating a characteristic of the force exerted on the first rail and the second rail.

20. A method for applying a lateral loading on a portion of a track, the method comprising:
   positioning a first contact portion adjacent an inner side surface of a first rail;
   positioning a second contact portion adjacent an inner side surface of a second rail, a line of action extending between the first contact portion and the second contact portion, the first contact portion and the second contact portion being connected to one another by a body that is offset from the line of action; and
   actuating a ram to cause the first contact portion and the second contact portion to exert a force on the first rail and the second rail.

21. The method of claim 20, further comprising actuating a relief valve to reduce fluid pressure in the ram and cause the ram to retract.

\* \* \* \* \*